May 7, 1963 W. W. GRAY 3,088,307
INSTRUMENT ADJUSTING DEVICE
Filed Aug. 29, 1960

Walter W. Gray  INVENTOR.

United States Patent Office 3,088,307
Patented May 7, 1963

3,088,307
INSTRUMENT ADJUSTING DEVICE
Walter W. Gray, Charlottesville, Va., assignor to Specialties, Incorporated, Syosset, Long Island, N.Y., a corporation
Filed Aug. 29, 1960, Ser. No. 52,477
3 Claims. (Cl. 73—1)

This invention relates to instruments generally and especially to a vertical speed indicator for aircraft.

The usefulness and desirability of an instrument to show the rate of gain or loss of altitude of an aircraft in flight has been well demonstrated. The manufacture and adjustment of vertical speed indicators and similar instruments have presented practical problems and this invention is concerned with feasible solutions of some of these problems.

In particular, it is an object of the invention to provide an instrument in which the indicator shaft or similar means can be easily aligned.

Another object is to provide a vertical speed indicator of rugged and simple construction and which can be readily adjusted.

An additional object is to provide a device for adjusting or aligning a shaft or other movable part of an instrument. Additional objects will be evident in the following description.

Figure 1:
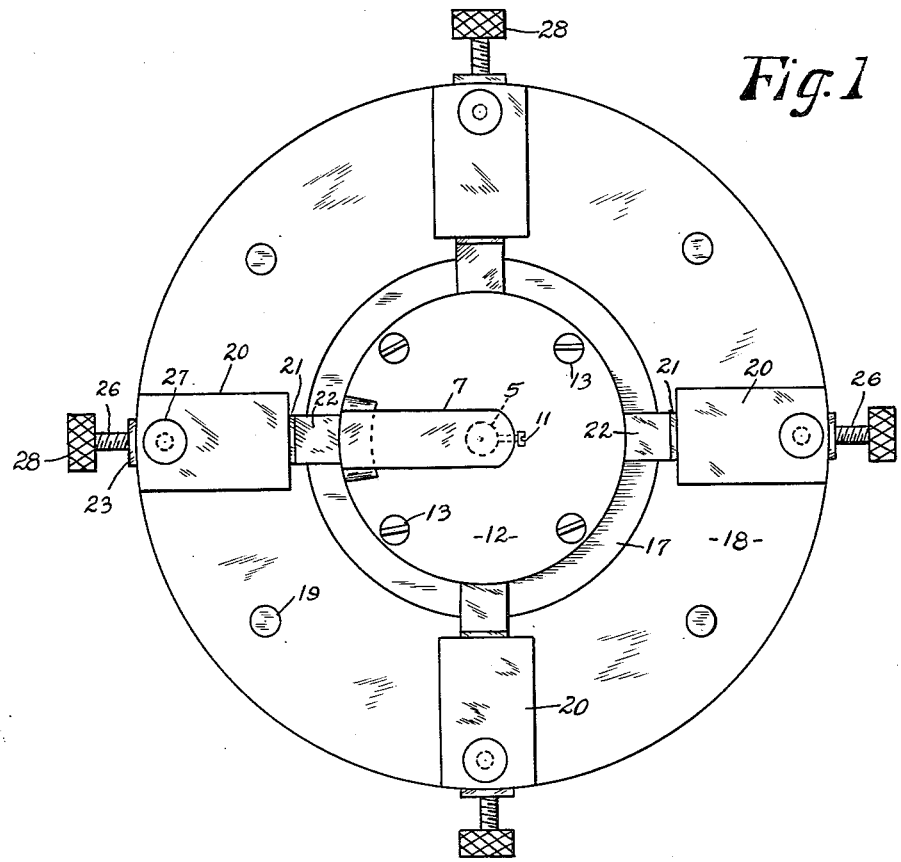
FIGURE 1 is a top plan view of my adjusting device and showing an instrument supported thereby.
Figure 2:
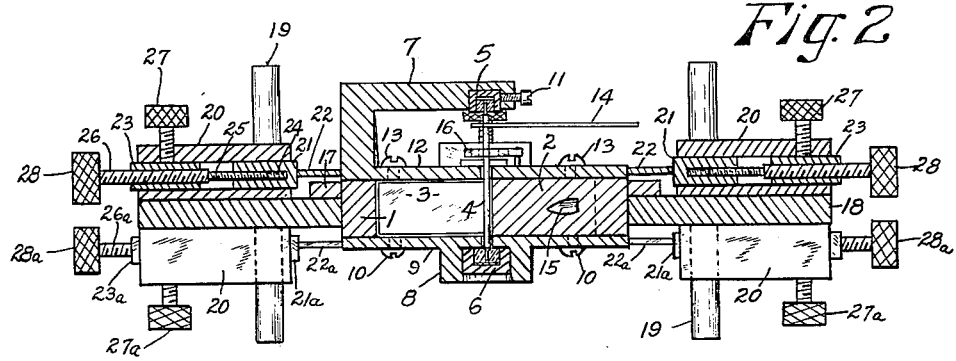
FIGURE 2 is an elevation, in part section, of the device and instrument shown in FIGURE 1.

Considering the instrument, which is a vertical speed indicator, generally cylindrical casing 1 has integral wedge or partition 2 dividing the casing into two chambers, one on either side of light weight vane 3 which is attached to shaft 4 the reduced ends of which are rotatable in respective upper and lower jewel bearings 5 and 6 nested in recesses in respective members 7 and 8. Boss 8 is integral with lower plate 9 which is fastened to the lower edge of cylinder 1 by means of screws 10 which pass through somewhat larger holes in plate 9 so that this plate and supported bearing 6 may be shifted to a limited extent in any desired radial direction. The bearing 6 may be fastened in recessed boss 8 by means of a screw similar to screw 11 which holds bearing 5 in place. Arm 7, holding bearing 5, is integral with top cover plate 12 which is fastened to the upper edge or rim of cylindrical member 1 by means of screws 13 the diameters of which are somewhat smaller than the holes in plate 12 so that this plate and supported bearing 5 may be shifted in any radial direction. Flange 17 may be integral with or attached to member 1.

Shaft 4, having attached pointer 14, passes through holes in plates 12 and 9. Air may flow to or from one chamber on one side of vane 3 through port 15 in partition 2 and a similar port in the opposite face of the partition leads to the other chamber. The relative volumes of these chambers will of course change as the vane is rotated by air flow. These ports are connected with suitable tubes or conduits for passage of air therethrough. Spiral spring 16 attached to shaft 4 and to a pin fixed to plate 12 biases the shaft and pointer to seek a normal or zero position. A suitable scale, not shown, is used in conjunction with the pointer to indicate vertical speed, either up or down.

The vane is fitted rather closely with respect to the cylinder, the partition, and the top and bottom cover plates. The spacing is usually not more than a few thousandths of an inch and the separation of shaft 4 from the edge of the partition is preferably much less than that. Since the vane assembly is very light and since the air gaps are quite small the instrument is very sensitive to mis-alignment of the bearings or to variations due to manufacturing tolerances. Prior instruments of this general type have not had broad military or commercial acceptance due to the difficulty and expense of manufacturing and due to the fact that it has been practically necessary to calibrate each instrument individually. This condition is very undesirable, particularly for military use, since identical replacement parts are important in military devices. Furthermore, the individual calibration and associated hand craftsmanship limits production and brings on undesirable increase of cost and other factors.

In order to overcome the above defects and other undesirable conditions I have devised a vertical speed indicator in which the vane can be adjusted in position relative to the container or cylinder so that uniform scales may be used and hand calibration is not required. Prior vane type instruments have not been adjustable and so the above described difficulties have been encountered in making and in repairing these instruments. I provide this adjustment by making both bearings for the vane shaft movable in radial direction by loosening screws 10 and 13 and then shifting the plates 9 and 12 until the pointer indicates the proper readings for the entire scale. Then the screws are tightened to hold the bearings in adjusted position. By this means and method the vane is brought closer to or further from associated surfaces of the housing comprising the cylindrical element and attached cover plates. Further, this flexible adjustment makes it possible for the vane to vary its distance of separation according to its angular position as indicated by the pointer and scale. Therefore, the instrument may be quickly adjusted to provide proper scale indications even though there are manufacturing errors. The instrument is adjusted while air is supplied to the ports or withdrawn therefrom in manner corresponding to predetermined conditions of vertical speed and altitude.

Since the torque on the vane due to the air flow around its edges varies as a power of the air gap a very small adjustment or radial shift of the bearings is usually required. In order to provide this small graduated shift I provide a differential screw feed for the purpose. Annular plate 18 has attached legs 19 for supporting either face of the plate above a table or other surface. Guide members 20 may be integral with or attached to plate 18 and are positioned 90 degrees apart on both faces of the plate. These guides have horizontal rectangular slots in which slides or blocks 21 and 21a, with fingers 22 and 22a, are movable toward or from the axis of plate 18. Slides 21 and 21a have radially directed threaded bores 24 in which threaded rods 25 of relatively fine pitch are rotatable. These rods are integral with threaded rods 26 and 26a of larger diameter and coarser pitch. The latter rods are rotatable in blocks 23 and 23a which are adjustable in radial direction in the slots in guides 20 and may be fastened in desired position by means of thumbscrews 27 and 27a threaded through holes in guides 20. While rods 25 and 26 are shown of different size, they could be of the same diameter. I have found that if rods 26 have 36 threads per inch and rods 25 have 40 threads per inch a satisfactory fineness of adjustment is provided.

Thumb-nuts or knurled knobs 28 and 28a are integral with respective rods 26 and 26a and may be turned to rotate the rods 26, 26a and 25. The blocks 23 and 23a are sufficiently spaced from slides 21 and 21a to allow adequate radial movement of fingers 22 and 22a.

In operation, the instrument to be adjusted is placed in the central circular opening in annulus 18, with flange 17 resting on that member. Prior to this the thumbscrews 27 and 27a are loosened and blocks 23 and 23a are moved outward to withdraw fingers 22 and 22a so that the instrument can be placed in the position shown. Then blocks 23 and 23a are moved inward until the fingers 22 touch cover plate 12 and fingers 22a are in contact with cover plate 9. Thumbscrews 27 and 27a are then turned to clamp blocks 23 and 23a in place. Next, the screws 13 are loosened and plate 12 and bearing 5 may be gradually shifted in any desired radial direction by turning the differentially threaded rods one way or the other by means of thumbscrews 28. This may be done while the instrument is being tested pneumatically as previously described and when the proper positioning of the bearing 5 and associated vane is achieved, the plate 12 is fastened in place by tightening screws 13. Prior instruments have not only been lacking in this adjustment but have actually had lips or rims on cover plates to prevent shifting of the plates. These instruments likewise have had only one attachable cover plate and not two as in my improved device.

It will be seen that cover 9 and bearing 6 may similarly be adjusted by loosening screws 10 and turning knobs 28a to cause fingers 22a to move plate 9 in the desired direction or directions. The fact that both bearings can be shifted provides great flexibility to the adjusting system. The plates 9 and 12 may be loosened and adjusted simultaneously or separately, as desired, and the device may be turned over so that plate 9 is in the upper position, when it is desired to do so for convenience in making adjustments.

The differential threads cause the slides to move very slowly for relatively rapid rotation of the knurled knobs 28—28a. Therefore, very fine adjustment is possible. The construction of the lower units 20 and associated parts in the same as that for the upper similar units.

The theory of operation of the instrument is that a chamber on one side of the vane is connected with the outside atmosphere through a tube and the chamber on the other side of the vane is connected with an air container or reservoir of suitable size. Then if the carrying aircraft rises the air in the container will rush past the vane in one direction, thereby causing the pointer to turn to a position indicating vertical speed. If the aircraft descends then air at higher pressure surrounding the aircraft will flow around the edges of the vane, and into the container, and so will apply torque to the vane in opposite direction.

Changes of detail can, of course, be made without departing from the principles I have disclosed.

What I claim is:

1. In a device for adjusting the alignment of an instrument shaft, an annular plate for supporting said instrument in the space surrounded by said plate, a plurality of guide members extending from both faces of said plate, a plurality of slides movable in said guide members in generally radial direction relative to the axis of said plate, said slides having blade-like extensions therefrom for pushing a plurality of movable members carrying bearings for a shaft of an instrument, and means including differential screw means for producing movement of said slides in said guide members, the working ends of said extensions being curved to fit a curved surface of said instrument.

2. In a device for adjusting the alignment of an element of an instrument, a member for supporting said instrument, a plurality of guide members extending from opposed faces of said member, a plurality of first slide means movable in said guide members, means for fastening said slide means in position relative to said guide members, a plurality of second slide means movable in said guide members for producing alignment of said element, a plurality of differential screw means connecting said first and second slide means and adjustable to cause predetermined movement of said second slide means, and a plurality of legs extending from both faces of said supporting member for holding said instrument in either of two positions.

3. In a device for adjusting the alignment of an instrument shaft, a member for supporting said instrument, a plurality of guide members extending from opposed faces of said member, a plurality of slides movable in said guide members, means including differential screw means for causing movement of said slides, extensions on said slides for contact with movable elements carrying bearings for said shaft, a plurality of supporting legs extending from both faces of said supporting member, each said differential screw means including a threaded member settable at various radial positions in said guide member, a screw rotatable in said threaded member, means for fastening said threaded member in said guide member, and another screw threaded into a threaded bore in said slide, said rotatable screw being of coarser pitch than said other screw and attached thereto.

References Cited in the file of this patent

UNITED STATES PATENTS

| 29,375 | Hinman | July 31, 1860 |
| 2,056,354 | Horn | Oct. 6, 1936 |
| 2,294,282 | Cerstvik | Aug. 25, 1942 |
| 2,377,965 | Rataiczak | June 12, 1945 |
| 2,411,621 | Grubbs | Nov. 26, 1946 |
| 2,876,554 | Reynard | Mar. 10, 1959 |

FOREIGN PATENTS

| 8,798 | Great Britain | 1906 |